(12) United States Patent
Nozaki et al.

(10) Patent No.: US 7,690,999 B2
(45) Date of Patent: Apr. 6, 2010

(54) SHAFT COUPLING (75) Inventors: Takashi Nozaki, Iwata (JP); Hiroyuki Hakamata, Iwata (JP); Keisuke Sone, Iwata (JP); Yoshihiko Hayama, Iwata (JP)

(73) Assignees: NTN Corporation, Osaka (JP); Bridgestone Corporation, Tokyo (JP)

( * ) Notice: Subject to any disclaimer, the term of this patent is extended or adjusted under 35 U.S.C. 154(b) by 583 days.

(21) Appl. No.: 10/579,785

(22) PCT Filed: Nov. 18, 2004

(86) PCT No.: PCT/JP2004/017186

§ 371 (c)(1),
(2), (4) Date: Apr. 3, 2007

(87) PCT Pub. No.: WO2005/050042

PCT Pub. Date: Jun. 2, 2005

(65) Prior Publication Data

US 2007/0270229 A1 Nov. 22, 2007

(30) Foreign Application Priority Data

Nov. 21, 2003 (JP) .............................. 2003-392145
Jan. 22, 2004 (JP) .............................. 2004-014051
Jan. 23, 2004 (JP) .............................. 2004-015970
Jun. 22, 2004 (JP) .............................. 2004-183559

(51) Int. Cl.
*F16D 3/04* (2006.01)
(52) U.S. Cl. ....................................... 464/15; 464/103
(58) Field of Classification Search .................. 464/15, 464/102–105, 145, 902
See application file for complete search history.

(56) References Cited

U.S. PATENT DOCUMENTS 2,343,244 A * 3/1944 Rose .......................... 464/103

(Continued)

FOREIGN PATENT DOCUMENTS

GB 2 114 259 8/1983

(Continued)

OTHER PUBLICATIONS

Japanese Notice of Reasons for Rejection issued Oct. 27, 2009 in the corresponding Japanese Patent Application No. 2004-014051 (with partial English translation).

*Primary Examiner*—Greg Binda
(74) *Attorney, Agent, or Firm*—Wenderoth, Lind & Ponack, LLP.

(57) ABSTRACT

A shaft coupling includes plates fitted on ends of input and output shafts, respectively. A plurality of guide grooves are formed in the opposed surfaces of the plates, respectively, so that each of the grooves extends perpendicular to the corresponding groove formed in the other plate. A steel ball is disposed between each pair of guide grooves of the plates at a portion where the pair of grooves cross each other. When the steel balls are pushed by the driving plate, they push the driven plate while rolling in the guide grooves, with their movements restricted by a retainer in the radial direction of the plates. Thus, large power can be smoothly transmitted between the rotary members with less frictional resistance. The offset amount can be changed easily. Between the plates, there are only the steel balls and the retainer.

25 Claims, 10 Drawing Sheets

U.S. PATENT DOCUMENTS

| | | | | |
|---|---|---|---|---|
| 4,611,373 | A * | 9/1986 | Hazebrook | 464/145 |
| 6,238,293 | B1 * | 5/2001 | Peinemann | |
| 6,370,772 | B1 * | 4/2002 | Honda et al. | |
| 6,497,622 | B1 * | 12/2002 | Bilz et al. | |
| 6,609,454 | B2 * | 8/2003 | Frost | |
| 6,805,082 | B2 * | 10/2004 | Takenaka et al. | 464/15 |
| 2002/0068639 | A1 * | 6/2002 | Tajima et al. | |
| 2003/0106758 | A1 * | 6/2003 | Hirota et al. | |

FOREIGN PATENT DOCUMENTS

| | | | |
|---|---|---|---|
| JP | 46-24731 | | 8/1971 |
| JP | 49-16889 | | 4/1974 |
| JP | 50-129852 | | 10/1975 |
| JP | 58-050147 | | 3/1983 |
| JP | 61-57233 | | 4/1986 |
| JP | 2-113123 | * | 4/1990 |
| JP | 2003-232380 | | 8/2003 |
| JP | 2003-260902 | | 9/2003 |

* cited by examiner

SHAFT COUPLING

BACKGROUND OF THE INVENTION

1. Technical Field

The present invention relates to a shaft coupling through which two shafts are coupled together so that power is transmitted therebetween.

2. Background Art

Shaft couplings are widely different in structure from each other depending on the positional relationship between driving and driven shafts which are coupled together through each shaft coupling so that power is transmitted from the driving shaft to the driven shaft. Typically, such two shafts are positioned so as to be aligned with each other, cross each other, or be parallel to (and not aligned with) each other.

Among shaft couplings through which two parallel shafts are coupled together, Oldham couplings are well-known. Oldham couplings have, however, a problem in that if large power is transmitted between the two shafts, friction surfaces of sliders disposed between the two shafts cannot always be lubricated sufficiently, thus impairing smooth transmission of power. Also, this arrangement does not permit a large offset (diametrical distance between the axes) of the two shafts.

It is also known to couple two parallel shafts together through two constant-velocity joint instead of an Oldham coupling. But in this arrangement, since the working angles of the constant-velocity joints are restricted, in order to increase the offset of the shafts, the axial lengths of the joints have to be increased. This increases the size of the entire apparatus.

JP Patent Publication 2003-260902A discloses a mechanism through which power can be transmitted between two shafts. This mechanism comprises two axially opposed rotary members (disks) and a plate disposed between the rotary members. A plurality of direct-acting guides are provided on each of the front and back sides of the plate so as to extend perpendicular to the corresponding direct-acting guides on the other of the front and back sides of the plate so that power can be transmitted between the rotary members through the plate and the direct-acting guides. This mechanism is short in axial length and thus the entire apparatus is small in size. By arranging steel balls between opposed surfaces in the direct-acting guides that move relative to each other, large power can be smoothly transmitted.

But in this type of shaft coupling, a large number of direct-acting guides are necessary, so that the manufacturing cost of the entire coupling tends to be high. Each direct-acting guide comprises a guide member and a rail member that are movable relative to each other. It is necessary to couple one of the guide member and the rail member to the corresponding rotary member and the other to the plate with high positional accuracy. It is therefore troublesome and time-consuming to mount the direct-acting guides with high accuracy such that their guide member and rail member are smoothly movable relative to each other.

SUMMARY OF THE INVENTION

An object of the invention is to provide a shaft coupling which is short in axial dimension, which can transmit large power between shafts even if the offset amount of the shafts is large, and which is less expensive and can be assembled easily.

According to the present invention, there is provided a shaft coupling comprising two axially opposed rotary members having rotation axes that are positioned so as to be parallel to and not aligned with each other, the rotary members having axially opposed surfaces axially facing each other, each of the axially opposed surfaces being formed with a plurality of guide grooves each axially facing and extending perpendicular to one of the guide grooves formed in the other of the axially opposed surfaces, rolling elements each disposed between a pair of axially facing guide grooves at a portion where the pair of axially facing guide grooves cross each other so as to roll while being guided by the pair of axially facing guide grooves, and a retainer for restricting movements of the rolling elements in a radial direction of the rotary members, whereby power is transmitted between the rotary members through the rolling elements (aspect 1).

With this arrangement, when the rolling elements are pushed by the driving rotary member, they push the driven rotary member while rolling in the guide grooves, with their movements restricted by the retainer in the radial direction of the rotary members. Thus, large power can be smoothly transmitted between the rotary members. A necessary offset amount is obtained by changing the length of the guide grooves. Between the rotary members, there are only the rolling elements and the retainer. Thus, the shaft coupling according to the invention is sufficiently short in axial length, can be manufactured at a low cost, and can be assembled easily.

In order to prevent plastic deformation of or surface damage to contact portions of the rotary members, the rolling elements and the retainer due to stresses that act thereon while power is being transmitted, these members are preferably made of a metallic material and have their surfaces subjected to hardening treatment (aspect 2).

Preferably, each of the guide grooves extends in a straight line in a longitudinal direction thereof so that the guide grooves can be formed easily. Also with this arrangement, it is possible to keep a constant surface pressure between the guide grooves and the rolling elements, thereby preventing excessive surface pressure (aspect 3). Preferably, each of the guide grooves extends at an angle of 45 degrees with respect to a radial direction of the rotary members so that the guide grooves can be formed more easily and also the surface pressure between the guide grooves and the rolling elements can be kept more constant to more positively prevent excessive surface pressure (aspect 4).

In order to prevent skewing, the rolling elements are preferably spherical members (aspects 5 to 10). In order to prevent rattling of such spherical rolling elements in the coupling while power is being transmitted, each of the guide grooves preferably has a plurality of surfaces that simultaneously contact the corresponding rolling element from both sides of the guide groove with respect to the width direction of the guide groove, thereby restricting movements of the spherical rolling elements in the width direction of the guide grooves (aspect 5). In order to increase the contact surface area with the spherical rolling elements, thereby reducing the surface pressure, each of the plurality of surfaces of each of the guide grooves may be a curved surface having a radius of curvature greater than the radius of the rolling elements (aspect 6). Each of the plurality of surfaces of each of the guide grooves may also be a flat surface so that the guide grooves can be formed more easily and can be designed more freely than when their surfaces are curved surfaces (aspect 7). Each of the guide grooves may have a portion which does not contact the corresponding rolling element and defines a recess so that the guide grooves can be formed more easily (aspect 8). The retainer may also have curved contact surfaces which contact the respective rolling elements and have a radius of curvature greater than the radius of the rolling elements so as to reduce the contact pressure between the retainer and the rolling elements (aspect 9). The retainer may also have flat contact surfaces which contact the respective rolling elements so that the retainer can be formed more easily (aspect 10).

Preferably, surfaces of the guide grooves that are brought into contact with the rolling elements, surfaces of the rolling elements and/or surfaces of the retainer that are brought into contact with the rolling elements are subjected to one or a plurality of surface treatments selected from dry plating, wet plating, melting treatment, flame spraying, ion implantation, sulfidization, chemical conversion, surface heat treatment and shot peening to reduce the friction coefficient of these surfaces (aspect 11). A lubricant is preferably disposed between contact surfaces of the guide grooves and the rolling elements and/or between contact surfaces of the retainer and the rolling elements (aspect 12). With these arrangements, it is possible to minimize wear and heat build-up due to sliding friction between the contact surfaces of the guide grooves or the retainer and the rolling elements and to reduce the resistance to relative movement of the rotary members when their rotation axes are displaced from each other.

Preferably, the shaft coupling further comprises an axial restrictor for restricting the axial distance between the rotary members within a predetermined range so that its members are securely joined together and the joint can be more easily assembled (aspect 13).

The axial restrictor may comprise two restrictor members each provided on a surface of one of the rotary members that is opposite to the axially facing surface of the one of the rotary members and sandwiching the rotary members (aspect 14).

Preferably, surfaces of the rotary members that are brought into the restrictor members and/or surfaces of the restrictor members that are brought into contact with the rotary members are subjected to one or a plurality of surface treatments selected from dry plating, wet plating, melting treatment, flame spraying, ion implantation, sulfidization, chemical conversion, surface heat treatment and shot peening to reduce the friction coefficient of these surfaces (aspect 15). Preferably, a lubricant or a sliding member is disposed between contact surfaces of the rotary members and the restrictor members (aspects 16 and 17). With these arrangements, it is possible to reduce the frictional force that acts between the rotary members and the restrictor members when the rotation axes of the rotary shafts are displaced from each other.

The shaft coupling may further comprise means for making the distance between the restrictor members variable, whereby the force with which the rotary members are sandwiched between the restrictor members is adjustable, thereby making it possible to easily reduce the frictional force that acts between the rotary members and the restrictor members (aspect 18). This means may be a thread coupling means through which the restrictor members are threadedly coupled together (aspect 19). Preferably, the shaft coupling further comprises an elastic member biasing each of the restrictor members against the axially opposed rotary member, thereby producing the force with which the rotary members are sandwiched between the restrictor members so as to prevent rattling of the rotary members and the restrictor members (aspect 20).

The restrictor members may be fixed in position such that the distance therebetween is constant so that the force with which the rotary members are sandwiched between the restrictor members is kept at a predetermined level for a long period of time without the need for adjustment (aspect 21).

If the shaft includes a coupling member extending through guide holes each formed in one of the rotary members to couple the restrictor members together, an a elastic member is preferably mounted on an outer peripheral surface of the coupling member and/or elastic members each mounted on an inner surface of one of the guide holes so that when the coupling member moves in the guide holes while repeatedly contacting and separating from their inner surfaces while power is being transmitted, the elastic member absorbs the impact of contact, thereby suppressing noise and vibrations (aspect 22). The elastic member or elastic members are preferably made of a material having high sliding properties (aspect 23). Specifically, the elastic member or elastic members may be made of a material comprising a rubber matrix to which a fluorine material is added (aspect 24).

In the arrangements of aspect 12 or 16, a lubricant is preferably retained in the shaft coupling, and the shaft coupling further comprises means for preventing entry of foreign matter into the shaft coupling from outside the shaft coupling to prevent an increase in frictional resistance of the respective parts during use (aspect 25).

According to the shaft coupling of the present invention, power is transmitted between the rotary members through the rolling elements, which are each disposed at a portion where the opposed pair of guide grooves cross each other. Thus, the frictional resistance between the respective members of the coupling while power is being transmitted is small, and large power can be smoothly transmitted. By increasing the length of the guide grooves, it is possible to easily increase the offset amount. Since only a small number of parts are disposed between the rotary members, the shaft coupling according to the present invention is short in axial length. Since no expensive parts which require high assembling accuracy, such as direct-acting guide, is used, the shaft coupling according to the present invention can be manufactured at a low cost and can be easily assembled.

According to the invention of any of aspects 2 to 4, it is possible to increase the power transmittable between two shafts and to extend the life of the coupling. According to the invention of aspect 3 or 4, the guide grooves can be formed easily, so that it is possible to further reduce the manufacturing cost of the coupling.

If the rolling elements are spherical members, the guide grooves are preferably formed according to aspect 5 to reduce rattling of the rolling elements in the coupling and thus to more smoothly transmit power. Also, according to aspect 6, it is possible to further increase power that can be transmitted between two shafts. According to aspect 7 or 8, the guide grooves can be formed easily. Similarly, by forming the retainer according to aspect 9, it is possible to increase the power that can be transmitted between two shafts. According to aspect 10, the retainer can be manufactured easily, so that it is possible to reduce the manufacturing cost of the coupling.

According to the aspect 11 or 12, it is possible to reduce wear and heat build-up on the contact surfaces of the guide grooves and the retainer and the rolling elements. Thus, the coupling can be used stably for a long period of time. Also, since the resistance to relative movement of the rotary members decreases, no high rigidity is required for bearings supporting the rotary members and other component parts of the coupling. This contributes to a further reduction in the manufacturing cost of the coupling.

According to aspect 13, because the various component parts of the coupling are joined together by the axial restrictor, the coupling can be more easily assembled. Also, during maintenance, the entire shaft coupling can be easily replaced with another such joint. The axial restrictor according to aspect 14 is simple in structure.

According to the invention of aspect 14, by applying the concept of any of aspects 15 to 19, it is possible to reduce wear and heat build-up on the contact surfaces of the rotary members and the restrictor members and also to reduce the resistance to relative movement of the rotary members. Thus, according to aspect 11 or 12, it is possible to stably operate the coupling and reduce its manufacturing cost. According to aspect 20, it is possible to prevent any increase in the distance between the rotary members by sandwiching the rotary members between the restrictor members. Thus, power can be more smoothly transmitted between two shafts. According to aspect 21, it is possible to reduce the frequency of maintenance.

In the invention of any of aspects 14 to 21, if the restrictor members are coupled together through a coupling member extending through guide holes of the rotary members, by applying the concept of aspect 22, it is possible to suppress noise and vibrations when the coupling member moves in the guide holes and to smoothly transmit power. According to aspect 23 or 24, it is possible to reduce the frictional resistance between the coupling member and the guide holes when the former slides in the latter and to reduce the wear of the elastic member. This reduces rattling of the parts of the coupling due to increased gaps between the coupling member and the guide holes, thus making it possible to more smoothly transmit power.

According to aspect 25, it is possible to suppress an increase in frictional resistance between parts of the coupling during use of the coupling, so that the coupling can be operated stably for a long period of time.

DETAILED DESCRIPTION OF THE INVENTION

Figure 1A:
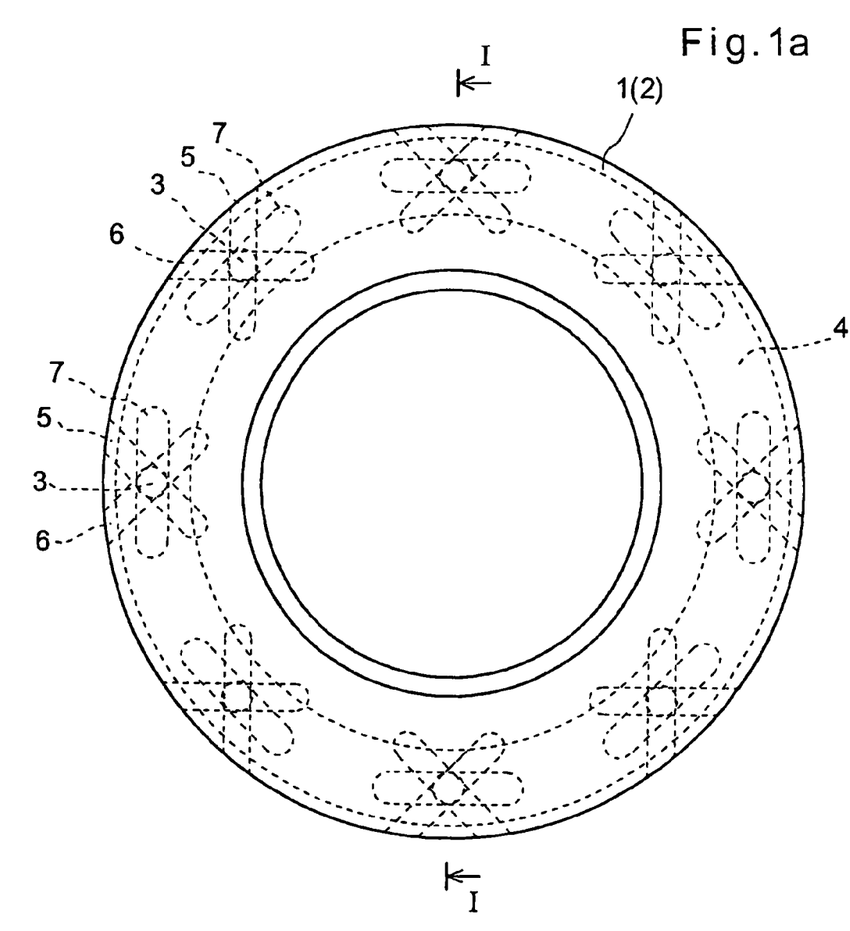
FIG. 1(a) is a side view of a shaft coupling of a first embodiment (rotation axes are aligned)
Figure 1B:
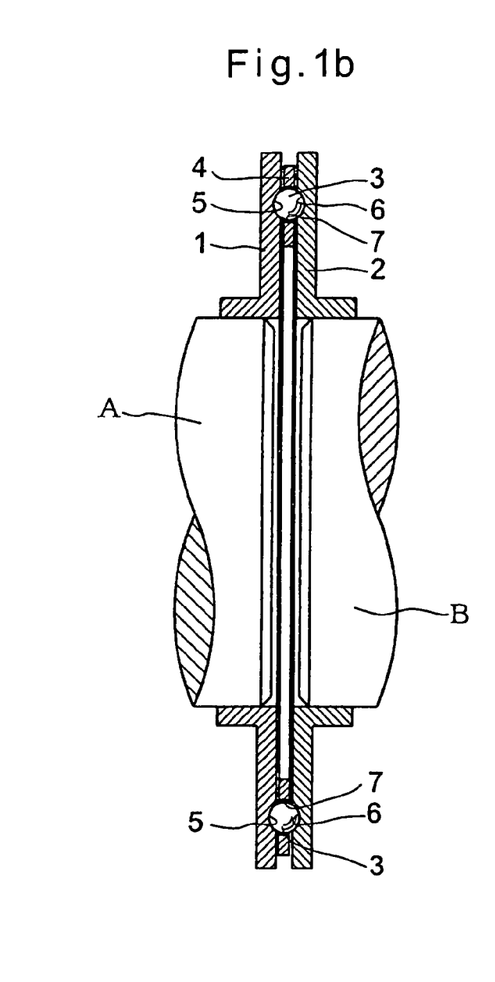
FIG. 1(b) is a sectional view taken along line I-I of FIG. 1(a)
Figure 2:
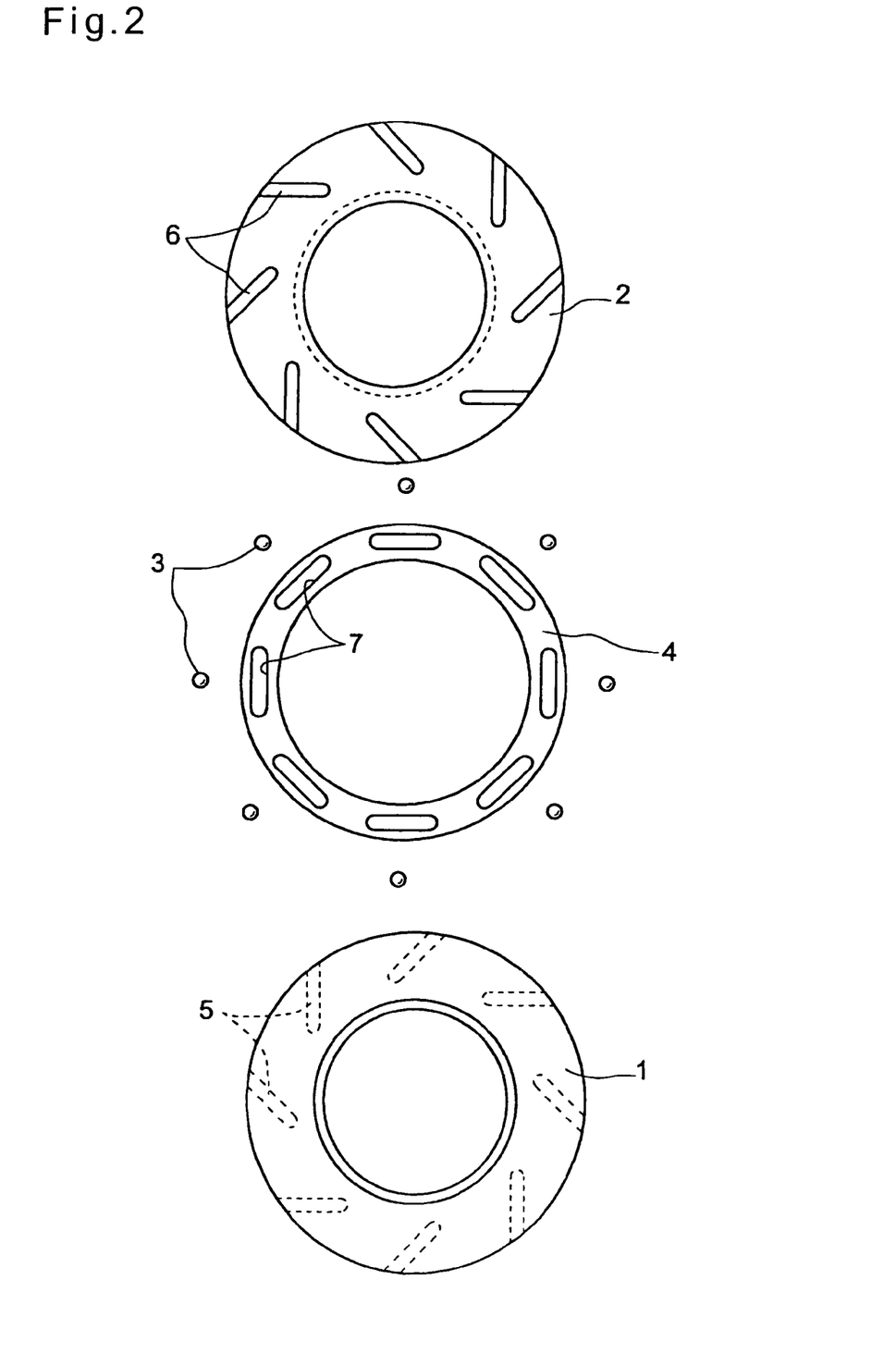
FIG. 2 is an exploded side view of the shaft coupling of FIGS. 1(a) and 1(b)

Now referring to FIGS. 1(a) to 8(b), the embodiments of the present invention are described. FIGS. 1(a) to 3(b) show the shaft coupling of the first embodiment, which comprises, as shown in FIGS. 1(a), 1(b) and 2, plates 1 and 2 as rotary members that are fitted on opposed ends of input and output shafts A and B, respectively, that are equal in diameter and having their central axes extending parallel to each other, a plurality of steel balls 3 as rolling elements that are disposed between the plates 1 and 2, and a retainer 4 that restricts radial movements of the steel balls 3. Power is transmitted between the plates 1 and 2 through the steel balls 3. The plates 1 and 2 and the retainer 4 are made of a metallic material. The plates 1 and 2, retainer 4 and steel balls 3 have their surfaces subjected to heat treatment or hardening treatment such as shot peening. In FIG. 1, for simplicity, the input and output shafts A and B are shown to be aligned with each other. But ordinarily, the shafts A and B have their central axes offset from each other, as will be described later.

The plates 1 and 2 are doughnut-shaped disks having tubular portions on the inner edges thereof which are fitted on the opposed ends of the input and output shafts A and B, respectively.

As shown in FIGS. 1(a) and 2, eight guide grooves 5 are formed in the surface of the plate 1 opposing the plate 2 so as to be circumferentially spaced apart from each other at equal angular intervals. Eight guide grooves 6 are formed in the surface of the plate 2 opposing the plate 1 so as to be circumferentially spaced apart from each other at equal angular intervals with each guide groove 6 axially facing and extending perpendicular to the corresponding one of the guide grooves 5. The steel balls 3 are each received between an axially opposed pair of guide grooves 5 and 6 at their crossing portions. The steel balls 3 thus roll while being guided by the guide grooves 5 and 6. The guide grooves 5 and 6 are circumferentially symmetrical to each other so that the forces transmitted between the respective steel balls 3 and each of the plates 1 and 2 are substantially equal to each other.

Each of the guide grooves 5 and 6 extends in a straight line that forms an angle of 45 degrees with respect to the radial direction of the plates and has an arcuate cross-section of which the radius of curvature is greater than the radius of the steel balls 3.

The retainer 4 is an annular member formed with eight straight elongated holes 7 extending perpendicular to the diametric direction and from one side of the retainer to the other side. The steel balls 3 are each received in one of the elongated holes 7. The steel balls 3 each contact one of the elongated holes 7 on its surface area having a cross-section of which the radius of curvature is greater than the radius of the steel balls 3.

The length of each of the guide grooves 5 and 6 of the plates 1 and 2 and the elongated holes 7 of the retainer 4 are equal to the sum of the maximum distance by which the central axes of the input and output shafts A and B are movable in the radial direction of the plates and the diameter of the steel balls 3.

When the input shaft A is rotated and the plate 1, which is fixed to the input shaft A, rotates, the steel balls 3 are pushed circumferentially by the guide grooves 5 of the (input) plate 1. Thus, with their movements in the radial direction of the plates restricted by the retainer 4, the steel balls 3 push the guide grooves 6 of the (output) plate 2, which is fixed to the output shaft B, thus rotating the plate 2. Power is thus transmitted to the output shaft B. Power is transmitted in this manner irrespective of the rotational direction of the input shaft A or when the input shaft A is rotated by the output shaft B.

Figure 3A:
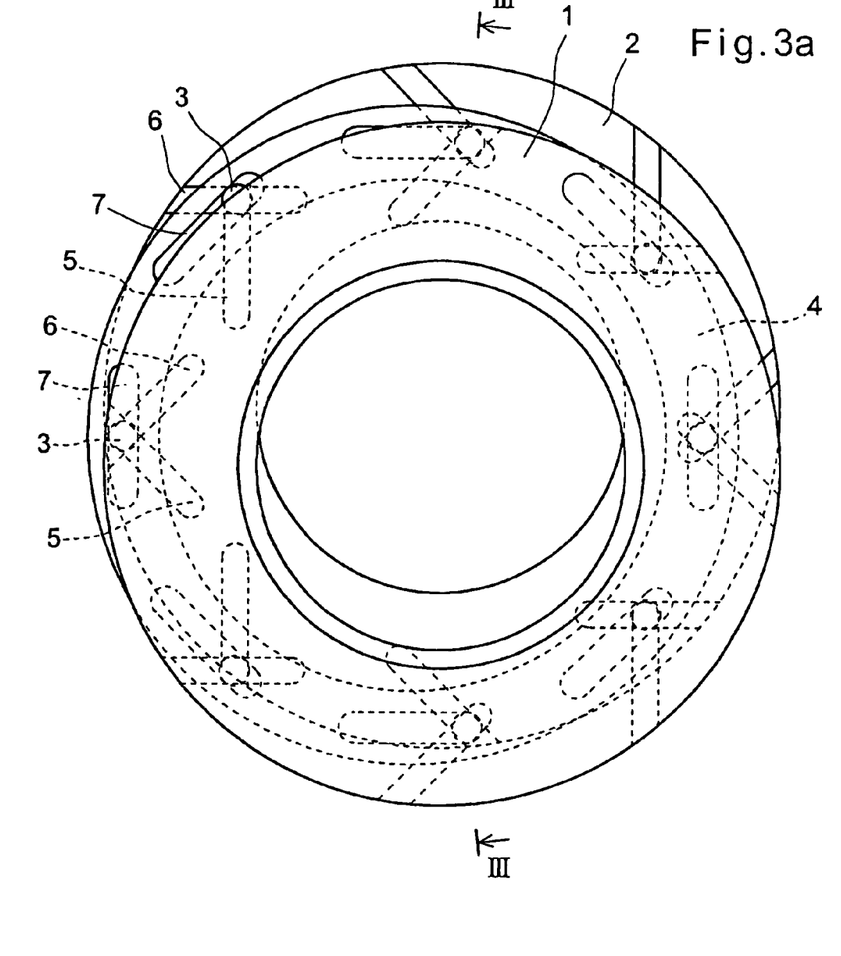
FIG. 3(a) is a side view of the shaft coupling of FIGS. 1(a) and 1(b) during use (rotation axes are not aligned)
Figure 3B:
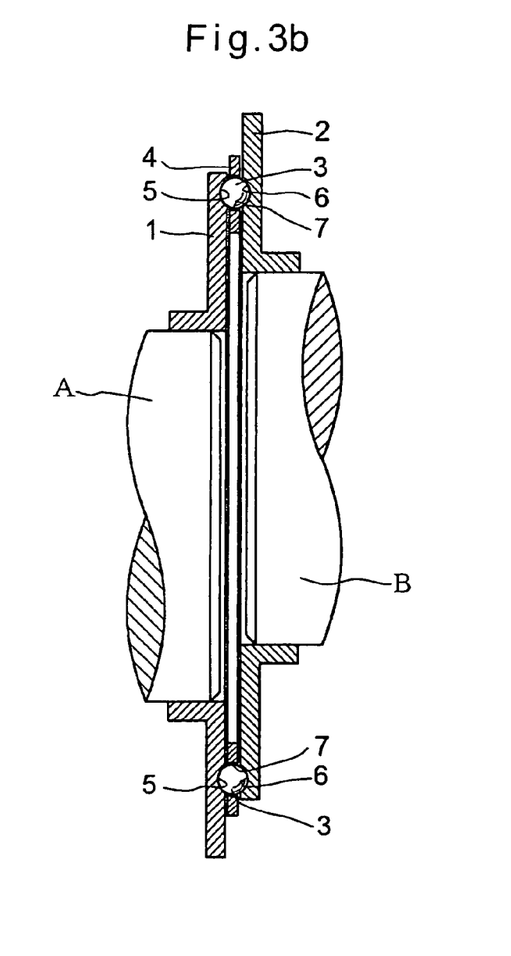
FIG. 3(b) is a sectional view taken along line III-III of FIG. 3(a)
Figure 4A:
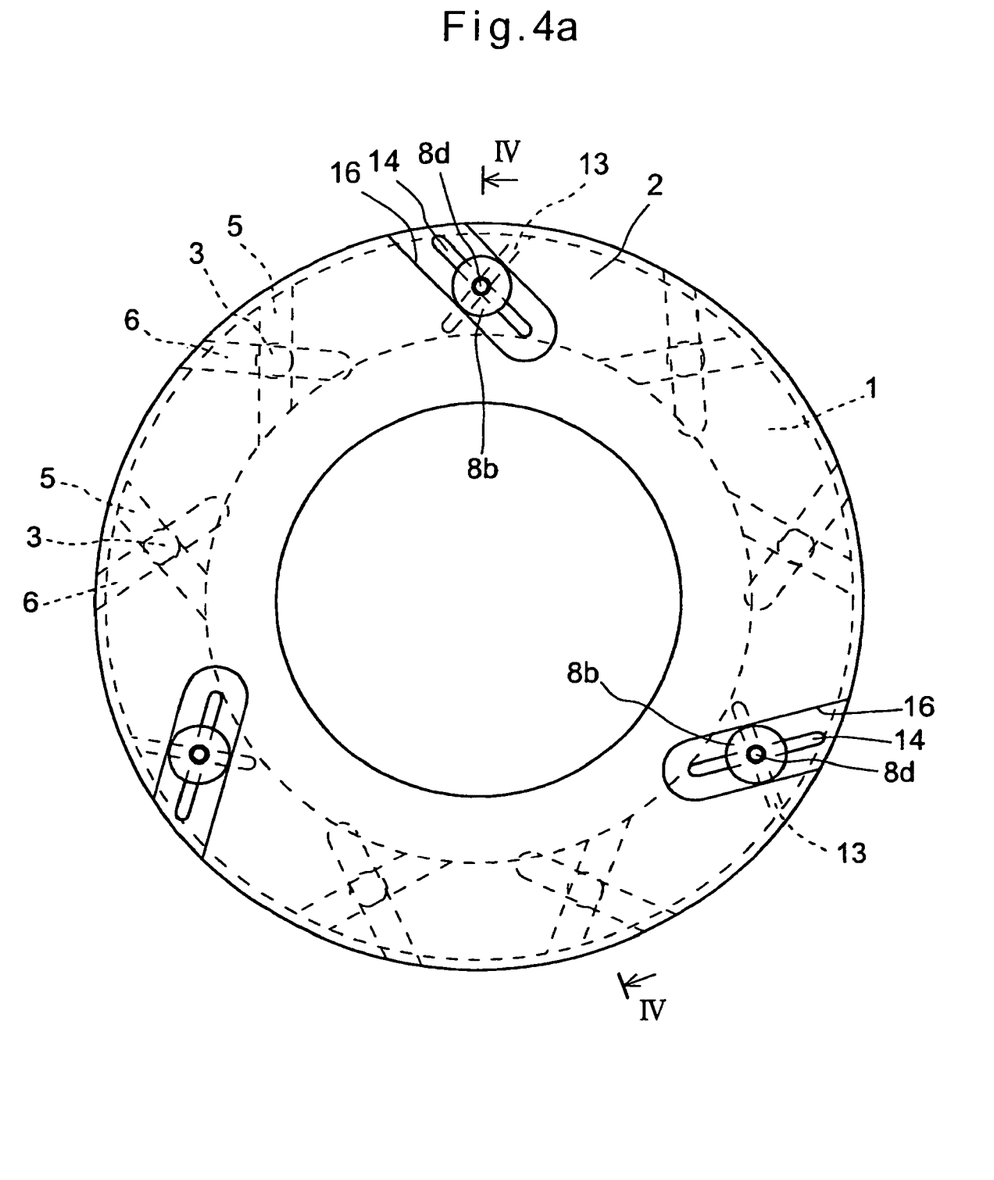
FIG. 4(a) is a partial side view of a shaft coupling of a second embodiment (rotation axes are aligned)
Figure 4B:
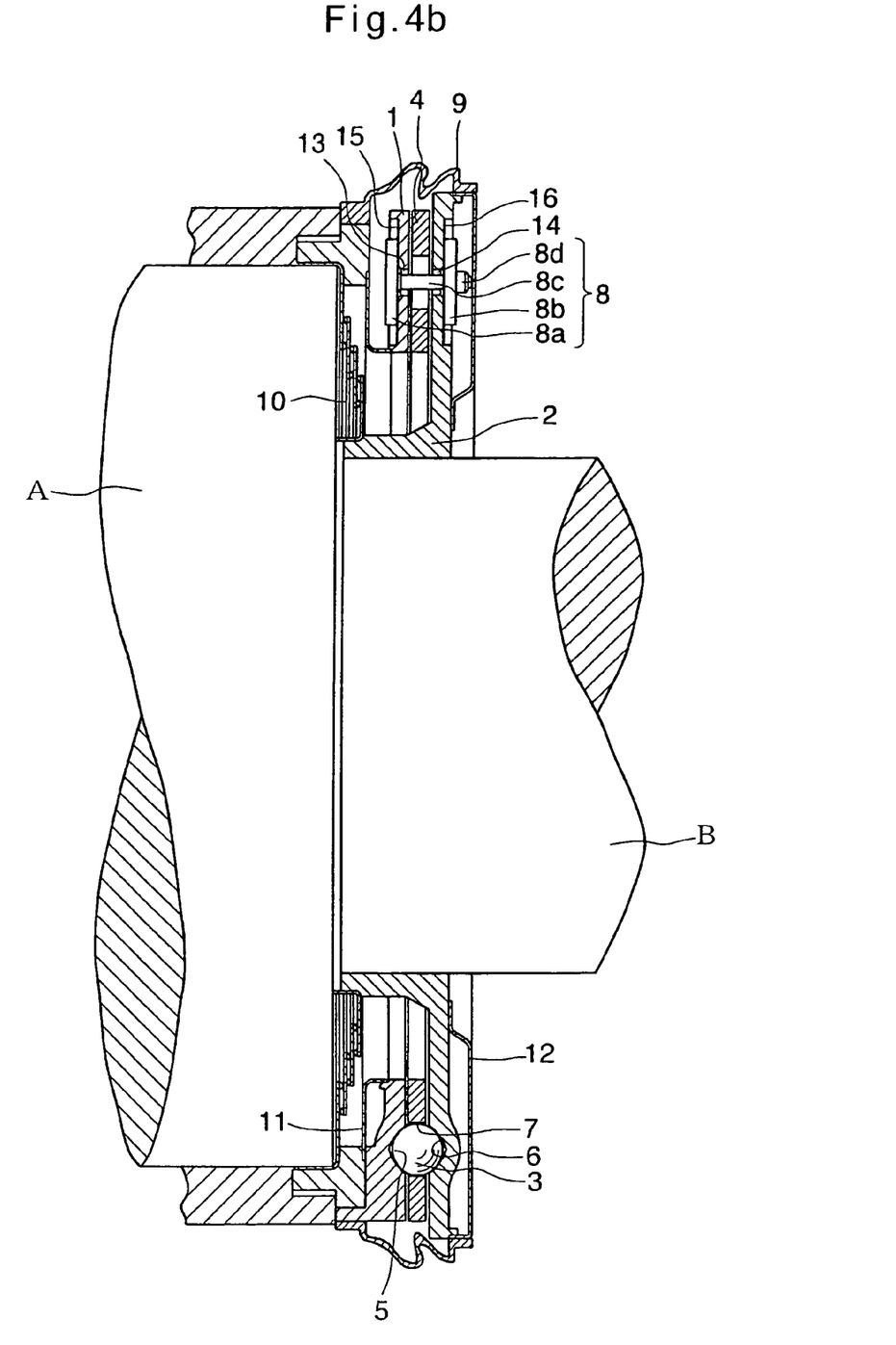
FIG. 4(b) is a sectional view taken along line IV-IV of FIG. 4(a)

Also, power is transmitted basically in the same manner as described above in an ordinary use condition in which the axes of the input and output shafts A and B are offset from each other as shown in FIGS. 3(a) and 3(b). In the state of FIGS. 3(a) and 3(b), since the central axes of the plates 1 and 2 are offset from each other, the crossing portions of each pair of guide grooves 5 and 6 change when the plates rotate, so that power is transmitted between the plates with the steel balls 3 rolling in the guide grooves 5 and 6 and the elongated holes 7 of the retainer 4.

Since this shaft coupling comprises only two plates 1 and 2 fixed to the input and output shafts A and B, respectively, steel balls 3 disposed between the plates 1 and 2, and the retainer 4 to transmit power, its axial dimension is extremely small. Also, each member forming the coupling is simple in structure and their assembling positions are automatically determined according to their shapes. Thus, the shaft coupling of this embodiment can be manufactured at a low cost and can be assembled easily.

Even when power is transmitted with the central axes of the input and output shafts offset from each other, only the steel balls 3 roll with none of the parts of the coupling sliding, so that large power can be transmitted smoothly with the least frictional resistance of the parts of the coupling. The coupling can also smoothly follow changes in the offset amount of the central axes of the two shafts. Moreover, since the offset amount of the central axes of the two shafts can be freely determined within the range of the length of the guide grooves 5 and 6 and the elongated holes 7 of the retainer 4, even if the offset amount of the central axes of the two shafts used is large, power can be transmitted therebetween by increasing the length of the guide grooves 5 and 6 and the elongated holes 7 of the retainer 7.

Moreover, since all the component parts of the coupling are made of a metal and their surfaces are subjected to hardening treatment, they are less likely to suffer plastic deformation or surface damage due to stresses acting between the parts. Also, since the guide grooves 5 and 6 extend at an angle of 45 degrees with respect to the radial direction of the plates, the guide grooves 5 and 6 can be formed easily, and the contact surface pressure between the guide grooves 5 and 6 and the steel balls 3 are kept constant. Further, since the guide grooves 5 and 6 and the elongated holes 7 of the retainer 4 have a cross-section having a radius of curvature greater than the radius of the steel balls 3, the contact pressure therebetween is kept low. This prevents the possibility of excessive surface pressure at contact portions between respective parts of the coupling. Since the rolling elements through which power is transmitted between the plates 1 and 2 are steel balls 3, the rolling elements never skew. Thus, large power can be stably transmitted for a prolonged period of time.

If it is not necessary to transmit large power, the parts of the coupling may be made of a synthetic resin such as an engineering plastic to improve mass-productivity and reduce the weight of the coupling. The contact surface of the retainer that is brought into contact with each steel ball may be a flat surface so that the retainer can be manufactured easily and thus the entire coupling can be manufactured at a low cost.

FIGS. 4(a) to 8(b) show the shaft coupling of the second embodiment, which includes two opposed plates 1 and 2 shaped such that ends of input and output shafts A and B having different diameters from each other can be fitted into the respective plates 1 and 2, and three axial restrictors 8 for restricting the axial distance between plates 1 and 2 to a predetermined range. Otherwise, this embodiment is identical to the first embodiment both in its basic structure and the mechanism of transmitting power. Thus, only what is different from the first embodiment is described below.

Figure 5A:
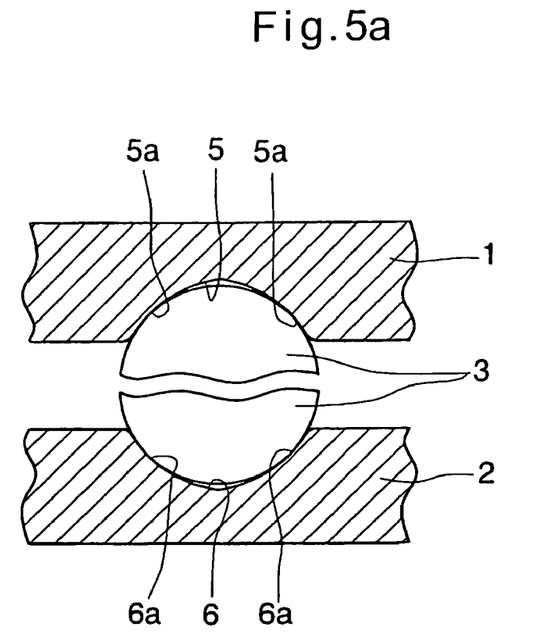
FIG. 5(a) is a partial sectional view of the shaft coupling of FIGS. 4(a) and 4(b), showing the sectional shape of a guide groove.

As shown in FIG. 5(a), the guide grooves 5 and 6 of this shaft coupling each have the shape of a Gothic arch comprising two symmetrical arcuate surfaces 5a, 6a each having a radius of curvature greater than the radius of the steel balls 3 and both contacting the steel ball 3 from both sides of the width of the groove. With this arrangement, movements of the steel balls 3 in the width direction of the respective guide grooves are restricted, so that even if there are any gaps between the steel balls 3 and the retainer 4, or if the parts loosen in the axial restrictors 8, power can be smoothly transmitted. Since the arcuate surfaces 5a and 6a have a radius of curvature greater than the radius of the steel balls 3, the contact surface pressure therebetween is small as in the first embodiment. The guide grooves 5 and 6 may have acute side edges, but preferably have curved side edges to prevent burrs when the grooves are formed, or have their side edges chamfered to remove any burrs.

Figure 5B:
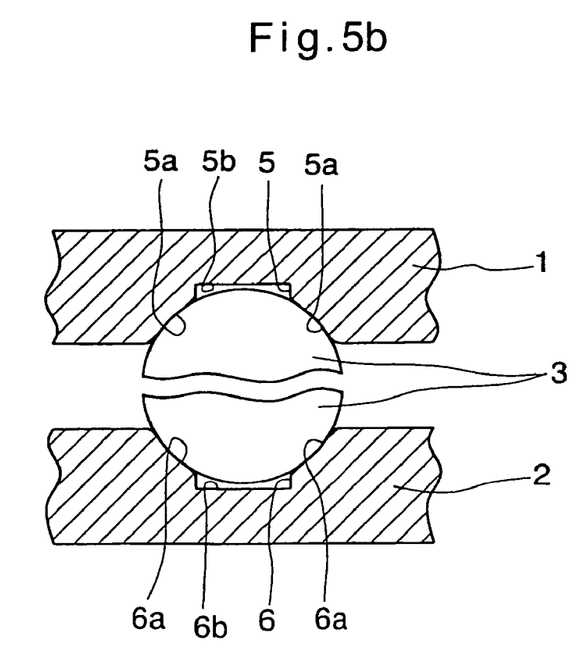
FIG. 5(b) shows the sectional shape of a different guide groove.

FIG. 5(b) shows modified guide grooves 5 and 6 which are each provided with a recess 5b, 6b in its bottom that does not contact the steel ball 3. Since the recesses 5b and 6b do not have to be finished with so high accuracy in dimensions and roughness as with the arcuate surfaces 5a and 6a, the guide grooves of FIG. 5(b) can be more easily formed than the guide grooves of FIG. 5(a).

Figure 6A:
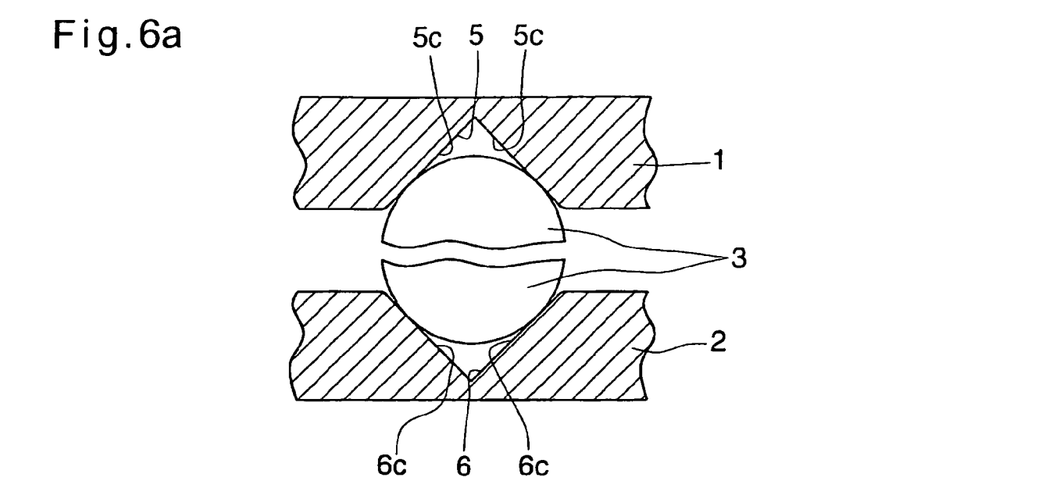
FIGS. 6(a) to 6(c) are sectional views of still different guide grooves.
Figure 6B:
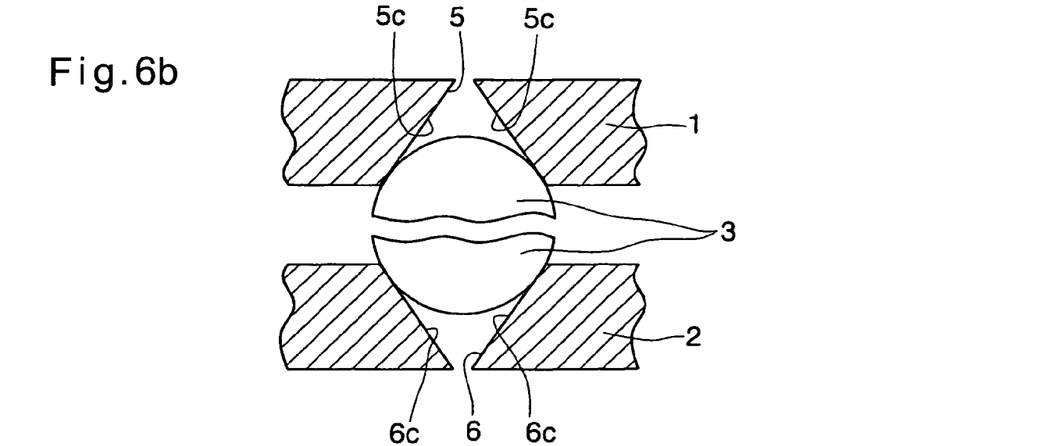
Figure 6C:
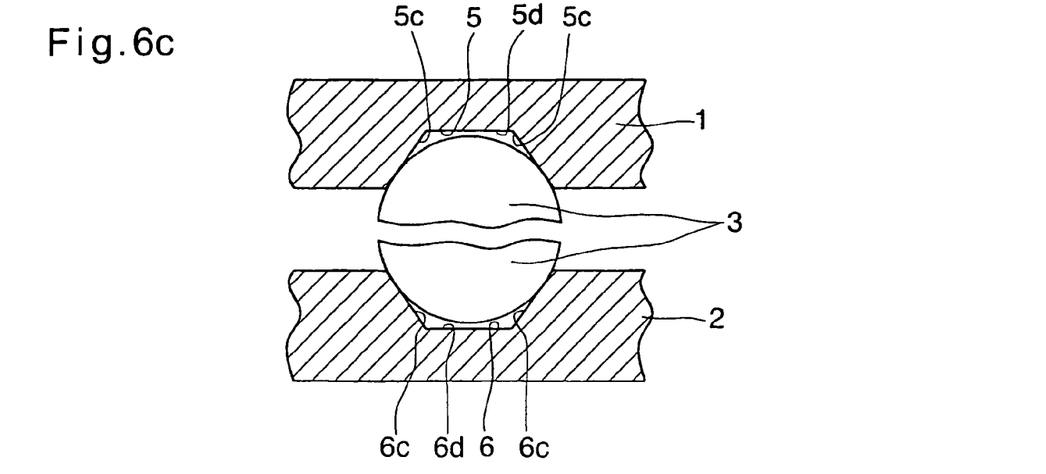

FIGS. 6(a) to 6(c) show still other guide grooves. The guide grooves 5 and 6 of FIG. 6(a) have a V-shaped cross-section, each comprising two flat surfaces 5c and 6c that simultaneously contact the steel ball 3 from both sides of the width direction of the groove. Such guide grooves can be more easily formed than the guide grooves of FIGS. 5(a) and 5(b), which have curved contact surfaces with the steel balls 3, and can be designed with higher freedom too.

The guide grooves of FIG. 6(b) comprise flat surfaces 5c and 6c having a different inclination angle from the flat surfaces 5c and 6c of the guide grooves of FIG. 6(a) to increase the contact angle with the steel balls 3, thereby reducing the axial force that acts on the axial restrictors 8. The guide grooves of FIG. 6(b) each have an open bottom like an elongated hole.

The guide grooves of FIG. 6(c) have flat surfaces 5c and 6c having a large contact angle as the flat surfaces of the guide grooves of FIG. 6(b), and small in depth so that the grooves 5 and 6 have a bottom. Thus, the plates 1 and 2 of this example have increased strength. In this example, the bottom surfaces of guide grooves 5 and 6 serve as the recesses 5d and 6d, so that no high accuracy is necessary to form the bottom surfaces of the grooves. Therefore, the guide grooves of this example can also be formed easily.

Description is now made of means for preventing slipping of the steel balls 3 of the shaft coupling. In this embodiment, the surfaces of the steel balls 3, the guide grooves 5 and 6 of the plates 1 and 2, and the surfaces of the elongated holes 7 of the retainer 4 that are brought into contact with the steel balls 3 are subjected to one or a plurality of surface treatments selected from dry plating, wet plating, melting treatment, flame spraying, ion implantation, sulfidization, chemical conversion, surface heat treatment and shot peening to reduce the friction coefficient of these surfaces. A lubricant is present between the contact surfaces of the guide grooves 5 and 6 and the steel balls 3 and between the contact surfaces of the elongated holes 7 of the retainer 4 and the steel balls 3. The lubricant is retained in the coupling. The coupling includes a radially outer boot 9, a radially inner seal 10, an outer cover 11 and an inner cover 12 to prevent entry of foreign matter into the coupling. Thus, even if some of the steel balls 3 slip when they are moving along the guide grooves 5 and 6 and the elongated holes 7 of the retainer 4, wear and heat build-up due to sliding friction are kept to a minimum for a long period of time, and the resistance to relative movement of the plates 1 and 2 in a direction in which their rotation axes shift from each other is small, too.

Among the abovementioned surface treatments, dry plating treatments include PVD (physical vapor deposition) treatment and CVD (chemical vapor deposition) treatment. In PVD treatment, a film of TiN, ZrN, CrN, TiC, TiCN, TiAlN, $Al_2O_3$, DLC (diamond-like carbon) or the like is preferably formed. In CVD treatment, a film of TiC, TiN, TiCN, TiCNO or the like, or a composite film of TiC/TiN, TiC, $Al_2O_3$, TiC/TiCNO, TiC/TiCN/TiN, TiC/TiCNO/TiN, TiC/TiCN/$Al_2O_3$, TiC/$Al_3O_2$/TiN or the like is preferably formed. Wet plating includes electroplating and electroless plating, and industrial chrome, electroless chrome or composite plating is used.

Melting treatment includes cladding, ironing and glazing. Flame spraying includes gas flame spraying and electric flame spraying. And films formed by flame spraying include chromium oxide, titanium oxide and zirconium films. Ion implantation includes high-energy implantation and medium-energy implantation. As sulfidization treatment, composite treatment is effective in which a film comprising a layer containing molybdenum disulfide as a solid lubricant is formed. Chemical conversion treatment includes phosphate treatment, iron phosphate treatment, manganese phosphate treatment and chromate treatment. Surface heat treatment includes surface hardening, carburization, nitriding and sulfurizing.

Among these treatments, dry plating, sulfidization and chemical conversion are especially effective in reducing the friction coefficient of the contact surfaces. Heat treatment such as nitriding can not only reduce the friction coefficient but improve the wear resistance.

As the lubricant, grease is used which comprises a mineral oil, a synthetic oil or a mixture thereof as a base oil, and a urea thickening agent. The grease further contains molybdenum disulfide, tungsten disulfide, melamine cyanurate, graphite or boron nitride as an extreme pressure agent, and molybdenum dithiocarbamate, zinc dithiocarbamate, zinc dithiophosphate, sulfuric additives, phosphoric additives, oiliness additives, dispersants and antioxidants. Preferably, in order to more stably supply grease, grooves as grease sumps are formed in portions of the guide grooves 5 and 6 which the steel balls 3 do not pass.

Figure 7:
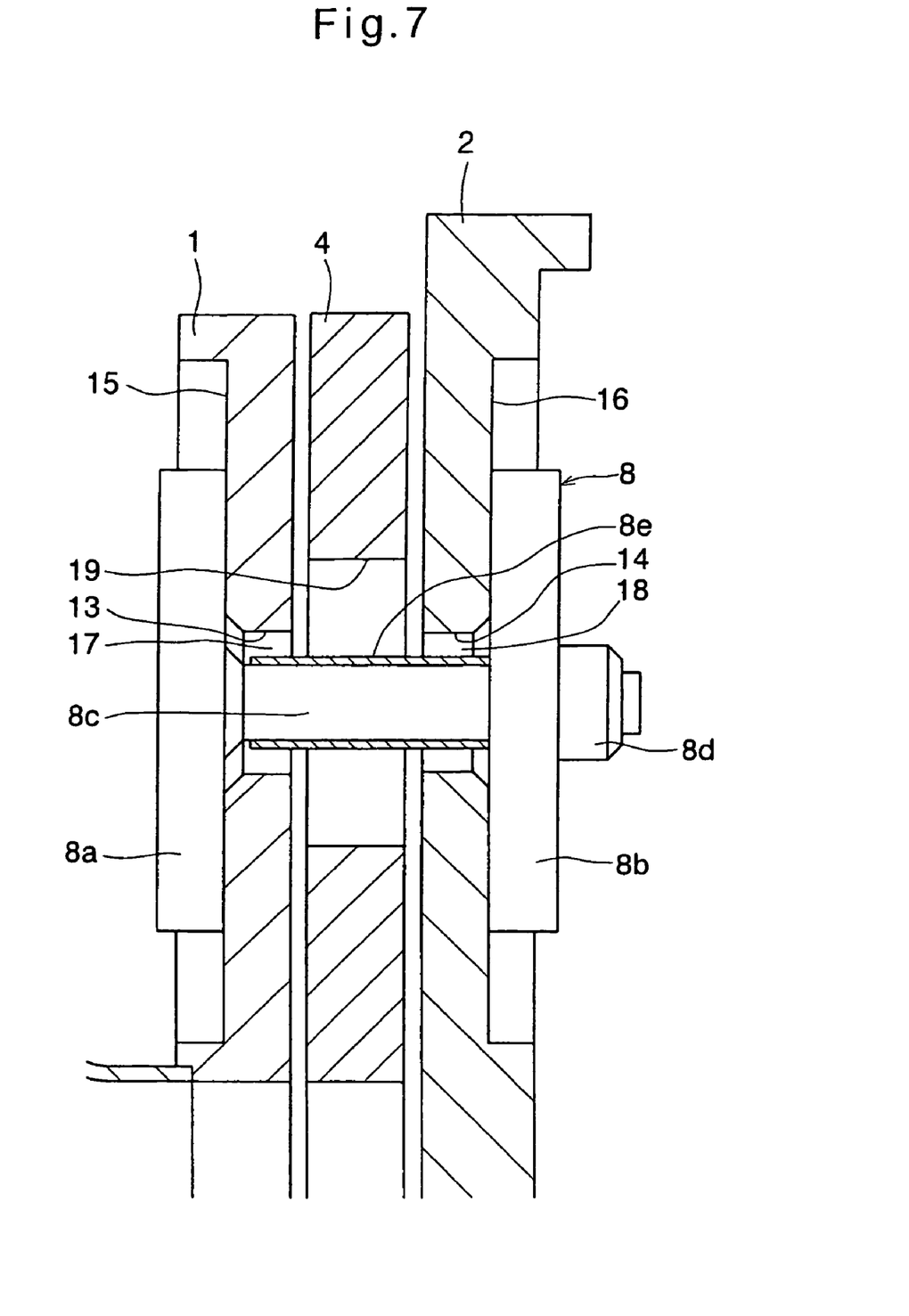
FIG. 7 is an enlarged sectional view of the shaft coupling of FIGS. 4(a) and 4(b), showing an axial restrictor.

Description is now made of the axial restrictors 8 of this shaft coupling. As shown in FIG. 7, the axial restrictors 8 each comprise two restrictor plates (restrictor members) 8a and 8b each provided on one of the surfaces of the plates 1 and 2 opposite to their surfaces axially facing each other, a pin 8c fixed to the restrictor plate 8a on the input side and extending through the plates 1 and 2, the retainer 4 and the restrictor plate 8b on the output side, and a lock nut 8d in threaded engagement with the free end of the pin 8c. By tightening the lock nut 8d of each restrictor 8, the restrictor plates 8a and 8b are pressed against the plates 1 and 2. Between any adjacent ones of the three axial restrictors 8, which are angularly spaced apart from each other at equal intervals, two axially opposed pairs of the six guide grooves 5 and six guide grooves 6 of the plates 1 and 2, two of the six elongated holes 7 of the retainer 4 and two of the six steel balls 3 are disposed so that they are circumferentially symmetrical to each other.

While not shown, a spring member such as a leaf spring is disposed between the restrictor plate 8b on the output side and the lock nut 8d of each restrictor to bias the restrictor plates 8a and 8b against the plates 1 and 2.

With this arrangement, simply by changing the tightening amount of the lock nuts 8d of the axial restrictors 8, it is possible to easily adjust the distance between the restrictor plates 8a and 8b and the force with which the restrictor plates 8a and 8b are pressed against the plates 1 and 2 through the spring member.

The pin 8c of each restrictor has its trunk covered with an elastic member 8e. The elastic member 8e is made of a material comprising a rubber matrix to which a fluorine material is added to improve its sliding properties while maintaining elasticity of the rubber (such as Bearee ER3600 and Bearee ER3201 made by NTN Engineering Plastics Corporation).

The plates 1 and 2 are formed with guide holes 13 and 14, respectively, through which the pins 8c of the axial restrictors 8 extend. Like the guide grooves 5 and 6, the guide holes 13 and 14 extend in a straight line at an angle of 45 degrees with respect to the radial direction of the plates 1 and 2. Between the respective guide holes 13 and 14 and the pins 8c, suitable gaps 17 and 18 are defined so that the pins 8c do not get stuck in the guide holes 13 and 14. The restrictor plates 8a and 8b are received in recesses 15 and 16 formed in the surfaces of the plates 1 and 2 facing the restrictor plates 8a and 8b.

The retainer 4 does not have to guide the pins 8c of the axial restrictors 8, so that its holes 19 through which the pins 8c extend have a far larger diameter than the outer diameter of the pins 8c so as not to interfere with the pins 8c.

Figure 8A:
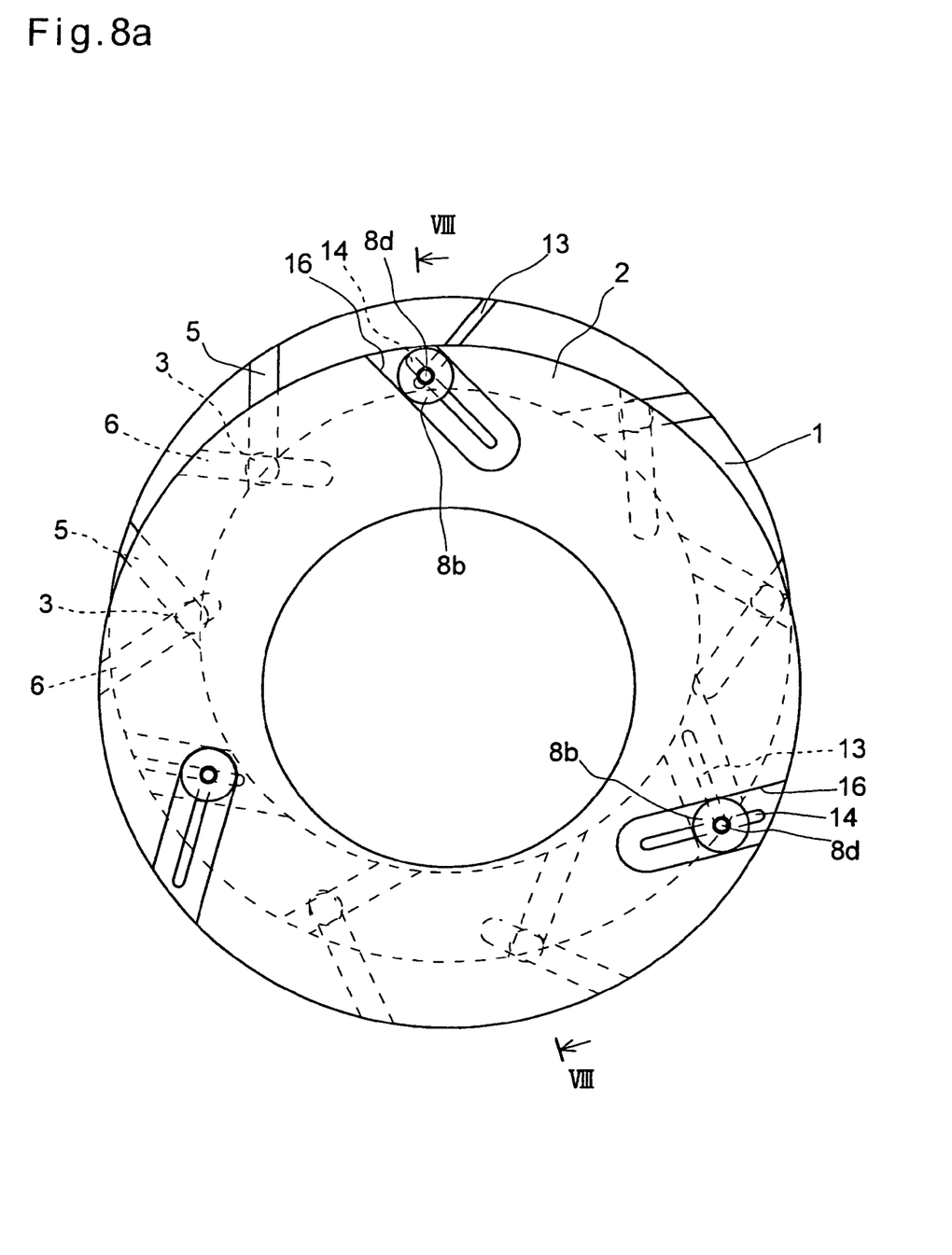
FIG. 8(a) is a partial side view of the shaft coupling of FIGS. 4(a) and 4(b) during use.
Figure 8B:
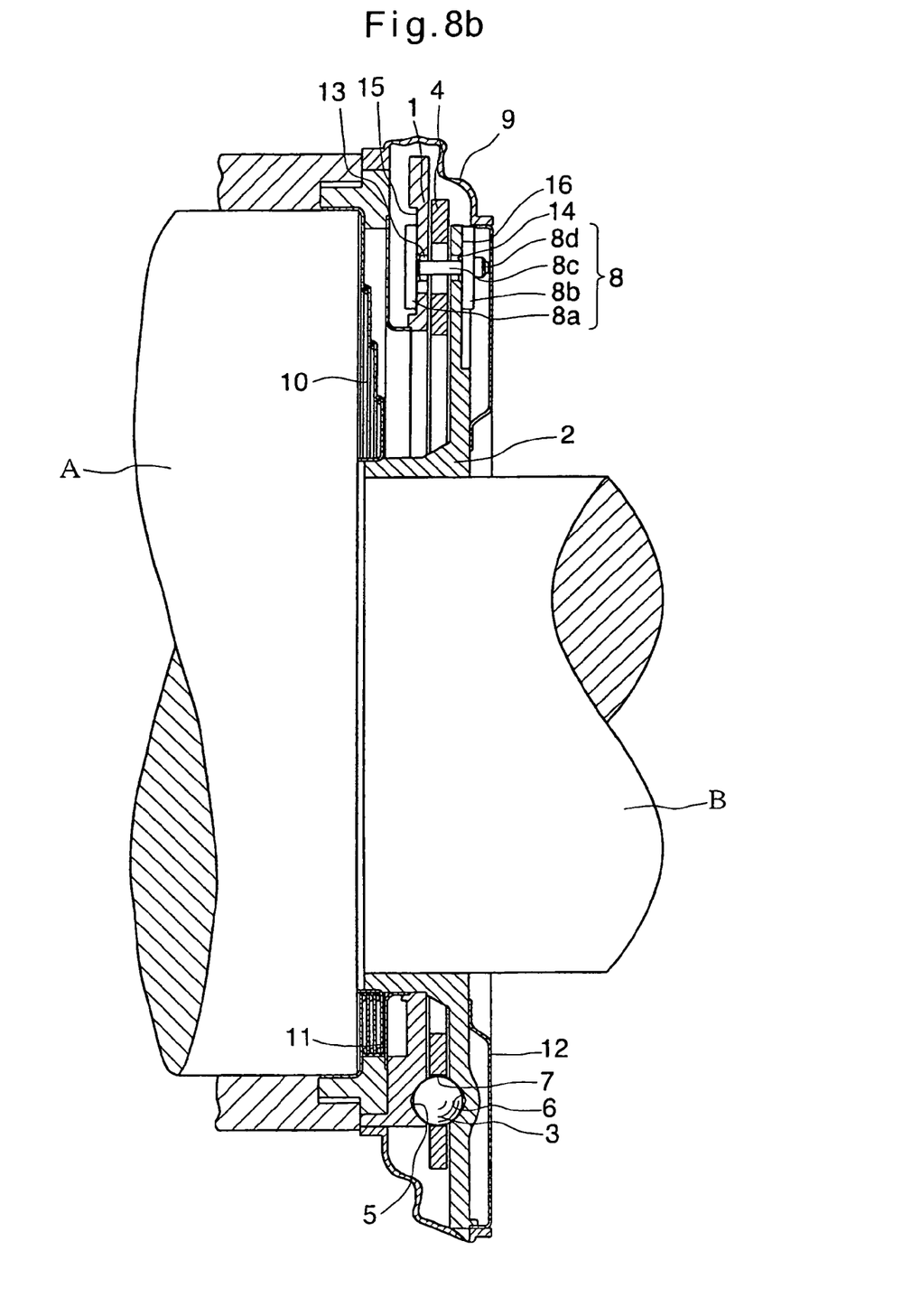
FIG. 8(b) is a sectional view taken along line VIII-VIII of FIG. 8(a).

With this arrangement, as shown in FIGS. 8(*a*) and 8(*b*), when the plates 1 and 2 rotate with the rotation axes of the input and output shafts A and B offset from each other, the pins 8c of the axial restrictors 8 move in the respective guide holes 13 and 14 of the plates 1 and 2, while the restrictor plates 8a and 8b slide on the surfaces of the recesses 15 and 16 of the respective plates 15 and 16. Thus, power is transmitted between the plates 1 and 2 with the distance therebetween unchanged.

When the pins 8c of the axial restrictors 8 move in the guide holes 13 and 14, the pins 13 and 14 are repeatedly brought into and out of contact with the inner side faces of the guide holes 13 and 14. The elastic members 8e covering the pins 8c absorb the shock of such contact. Since the elastic members 8e are made of a material having excellent sliding properties, the pins 8c can slide on the guide holes 13 and 14 with less frictional resistance, and the elastic members 8e are less likely to become worn. Thus, the gaps 17 and 18 defined between the pins 8c and the guide holes 13 and 14 are less likely to expand, so that the pins 8c are stably held in the guide holes 13 and 14. This makes it possible to smoothly transmit power without noise and vibrations.

In the embodiment, the elastic members are mounted on the outer periphery of the pins. But instead of or in addition to such elastic members, similar elastic members may be mounted on the inner side surfaces of the guide holes. Such elastic members may be made of an ordinary rubber or plastic. But in order to smoothly transmit power, they are preferably made of a material having excellent sliding properties such as mentioned above.

By suitably tightening the lock nuts 8d, it is possible to sandwich the plates 1 and 2 between the restrictor plates 8a and 8b with no gaps present between the restrictor plates 8a and 8b and the plates 1 and 2, thereby reducing the frictional force produced between the restrictor plates 8a and 8b and the recesses 15 and 16 of the plates 1 and 2 while minimizing an increase in the distance between the plates 1 and 2.

In order to further reduce the frictional force produced between the restrictor plates 8a and 8b and the recesses 15 and 16 of the plates 1 and 2, their contact surfaces are subjected to one or more than one of the abovementioned surface treatments, which are also applied to the steel balls 3, guide grooves 5 and 6 and retainer 4 in order to prevent slipping therebetween, thereby providing contact surfaces that are small in friction coefficient. Between the contact surfaces, grease as mentioned above is present as a lubricant. While not shown, grooves as grease sumps are formed in the contact surfaces to stably supply grease. In order to further reduce the frictional force, a sliding material may be disposed between the contact surfaces. For example, a sheet of a synthetic resin having excellent sliding properties such as polytetrafluoroethylene (PTFE) may be stuck on at least one of the contact surfaces, or small steel balls may be disposed therebetween.

By suitably determining the center of curvature of each of the arcuate surfaces 5a and 6a of the guide grooves 5 and 6 shown in FIG. 5(a) and its curvature so as to increase the contact angle between the steel balls 3 and the guide grooves 5 and 6, it is possible to reduce the axial force applied to the axial restrictors 8 through the plates 1 and 2 and the steel balls 3 while power is being transmitted, thereby reducing the frictional force between the restrictor plates 8a and 8b and the recesses 15 and 16 of the plates 1 and 2.

When it is not necessary to adjust the distance between the restrictor plates such as during mass-production, the restrictor plates can be fixed in position by e.g. crimping so that the distance therebetween is constant, thereby further shortening the axial length of the coupling and keeping the force with which the restrictor plates sandwich the plates 1 and 2 at a constant level for a long period of time. This makes it possible to reduce the frequency of maintenance.

In this embodiment, since the members of the coupling are integrally coupled together by the simple axial restrictors 8, the coupling of this embodiment can be assembled more easily than the coupling of the first embodiment. During maintenance, the entire coupling can be replaced with a new one.

By the provision of the means for reducing wear and heat build-up due to sliding friction between the steel balls 3 and the guide grooves 5 and 6, between the steel balls 3 and the retainer 4, and between the restrictor plates 8a and 8b and the recesses 15 and 16 of the plates 1 and 2, power can be transmitted with a minimum loss, and the coupling can stably maintain its function for a long period of time. Resistance to relative movement of the plates 1 and 2 is small, so that high rigidity is not required for bearings (not shown) supporting the input and output shafts A and B, and other members of the coupling. The coupling can therefore be manufactured at a low cost.

What is claimed is:

1. A shaft coupling comprising:
two axially opposed rotary members having rotation axes that can be positioned so as to be parallel to and not aligned with each other, said rotary members having axially opposed surfaces axially facing each other, each of said axially opposed surfaces being formed with a plurality of guide grooves each axially facing and extending perpendicular to one of the guide grooves formed in the other of said axially opposed surfaces;
rolling elements each disposed between a pair of axially facing guide grooves at a portion where the pair of axially facing guide grooves cross each other so as to roll while being guided by the pair of axially facing guide grooves;
and a retainer for restricting movements of said rolling elements in a radial direction of said rotary members, whereby power is transmitted between said rotary members through said rolling elements;
wherein said retainer has elongated holes formed therein, each of said elongated holes extending perpendicular to a diametric direction at a location corresponding to the portion where the respective pair of axially facing guide grooves cross each other;
and wherein said rolling elements are respectively rollably disposed in said elongated holes.

2. The shaft coupling of claim 1 wherein
said rotary members, said rolling elements and said retainer are made of a metallic material and have surfaces that are subjected to hardening treatment.

3. The shaft coupling of claim 1 wherein
each of said guide grooves extends in a straight line in a longitudinal direction thereof.

4. The shaft coupling of claim 3 wherein
each of said guide grooves extends at an angle of 45 degrees with respect to a radial direction of said rotary members.

5. The shaft coupling of claim 3 wherein
said rolling elements are spherical members, and wherein each of said guide grooves has a plurality of surfaces that simultaneously contact the corresponding rolling element from both sides of the guide groove with respect to the width direction of the guide groove.

6. The shaft coupling of claim 5 wherein
each of said plurality of surfaces of each of said guide grooves is a curved surface having a radius of curvature greater than the radius of said rolling elements.

7. The shaft coupling of claim 5 wherein
each of said plurality of surfaces of each of said guide grooves is a flat surface.

8. The shaft coupling of claim 5 wherein
each of said guide grooves has a portion which does not contact the corresponding rolling element and defines a recess.

9. The shaft coupling of claim 1 wherein
said rolling elements are spherical members, and wherein said retainer has curved contact surfaces which contact the respective rolling elements and have a radius of curvature greater than the radius of said rolling elements.

10. The shaft coupling of claim 1 wherein
said retainer has flat contact surfaces which contact the respective rolling elements.

11. The shaft coupling of claim 1, wherein
surfaces of said guide grooves that are brought into contact with said rolling elements, surfaces of said rolling elements and/or surfaces of said retainer that are brought into contact with said rolling elements are subjected one or a plurality of surface treatments selected from dry plating, wet plating, melting treatment, flame spraying, ion implantation, sulfidization, chemical conversion, surface heat treatment and shot peening to reduce the friction coefficient of these surfaces.

12. The shaft coupling of claim 1 wherein
a lubricant is disposed between contact surfaces of said guide grooves and said rolling elements and/or between contact surfaces of said retainer and said rolling elements.

13. The shaft coupling of claim 12 wherein
a lubricant is retained in the shaft coupling, the shaft coupling further comprising means for preventing entry of foreign matter into the shaft coupling from outside the shaft coupling.

14. The shaft coupling of claim 1 further comprising
an axial restrictor for restricting the axial distance between said rotary members within a predetermined range.

15. The shaft coupling of claim 14 wherein
said axial restrictor comprises two restrictor members each provided on a surface of one of said rotary members that is opposite to the axially facing surface of said one of said rotary members and sandwiching said rotary members.

16. The shaft coupling of claim 15 wherein
surfaces of said rotary members that are brought into said restrictor members and/or surfaces of said restrictor members that are brought into contact with said rotary members are subjected to one or a plurality of surface treatments selected from dry plating, wet plating, melting treatment, flame spraying, ion implantation, sulfidization, chemical conversion, surface heat treatment and shot peening to reduce the friction coefficient of these surfaces.

17. The shaft coupling of claim 15 wherein
a lubricant is disposed between contact surfaces of said rotary members and said restrictor members.

18. The shaft coupling of claim 15 wherein
a sliding member is disposed between said rotary members and said restrictor members.

19. The shaft coupling of claim 15 further comprising
means for making the distance between said restrictor members variable, whereby the force with which said rotary members are sandwiched between said restrictor members is adjustable.

20. The shaft coupling of claim 19 wherein
said means is a thread coupling means through which said restrictor members are threadedly coupled together.

21. The shaft coupling of claim 19 further comprising
an elastic member biasing each of said restrictor members against the axially opposed rotary member, thereby producing the force with which said rotary members are sandwiched between said restrictor members.

22. The shaft coupling of claim 15 wherein
said restrictor members are fixed in position such that the distance therebetween is constant.

23. The shaft coupling of claim 15 further comprising
a coupling member extending through guide holes each formed in one of said rotary members, said restrictor members being coupled together through said coupling member, and an elastic member mounted on an outer peripheral surface of said coupling member and/or elastic members each mounted on an inner surface of one of said guide holes.

24. The shaft coupling of claim 23 wherein
said elastic member or elastic members are made of a material having sliding properties.

25. The shaft coupling of claim 24 wherein said
elastic member or elastic members are made of a material comprising a rubber matrix to which a fluorine material is added.

* * * * *